Patented Apr. 15, 1947

2,419,131

UNITED STATES PATENT OFFICE 2,419,131

CARBOXYLATION OF ISO-OLEFINS

Thomas A. Ford, Wilmington, Del., assignor to E. I. du Pont de Nemours & Company, Wilmington, Del., a corporation of Delaware No Drawing. Application February 23, 1945, Serial No. 579,491.

6 Claims. (Cl. 260—533)

This invention relates to a process for carboxylating certain olefins and more particularly to the preparation of trimethylacetic acid and other substituted acids by carboxylating isoolefins.

It is known that olefins can be converted to carboxylic acids by reaction with carbon monoxide and water. Agents which have been proposed for effecting the condensation are metal salts, metal carbonyls, metal oxides, inorganic acids, boron trifluoride, and the like. The carboxylations have been carried out at high temperatures and generally under vapor phase conditions, although with highly active catalysts such as boron trifluoride, carboxylations have been effected in the liquid phase. The processes of the prior art, however, do not teach how to prepare from inexpensive raw materials the valuable trimethylacetic acid and related substituted carboxylic acids.

An object of the present invention is to provide a process for the carboxylation of certain olefins containing at least three carbon atoms. Another object is to provide a process for the liquid phase reaction of such olefins with carbon monoxide and water in the presence of highly active catalysts for the reaction. A further object is to provide conditions of temperature and pressure as well as reactants and catalysts for effecting the carboxylations so as to produce the desired acids in maximum yields. Other objects and advantages of the invention will hereinafter appear.

Carboxylic acids such as trimethylacetic acid and other substituted organic carboxylic acids are produced in accord with the invention by the reaction of olefins, containing more than three carbon atoms and in which the sole carbon to carbon unsaturation is that arising from the presence of ethenic double bonds, and in which at least three of the valences of one of the doubly bonded carbon atoms are satisfied by carbon atoms, with carbon monoxide at temperatures ranging from 50° to 200° C., pressures between 100 and 1500 atmospheres and in the presence of aqueous sulfuric acid of from about 64 to 84% concentration.

In practicing the invention, any high-pressure reactor which is constructed of or lined with an acid resisting material can be used. A suitable apparatus consists of a silver-lined tube capable of withstanding pressures up to 1500 atmospheres and above and fitted with a valve and connecting line of high-pressure tubing and means for controlling the internal temperature. Some means of agitation should be provided, and this may be achieved conveniently by imparting a rocking or shaking motion to the reactor as a whole. The reactor is charged with a sufficient quantity of the aqueous sulfuric acid condensing agent to occupy about one-fourth of the free space in the reactor. The reactor is evacuated, and the olefin is added. Approximately one mole of olefin per mole of sulfuric acid is charged, the vessel is then pressured with carbon monoxide, closed, and placed on an agitating machine, and agitation is started. The reactor is heated to the desired reaction temperature and maintained at that temperature until there is no further reaction, as evidenced by cessation of pressure drop within the reactor. Throughout the reaction period the pressure within the reactor is maintained by periodically repressuring with carbon monoxide. After reaction is complete, as evidenced by cessation of pressure drops, the reactor is cooled, pressure is released, and the product is discharged. Ordinarily the products separate into two layers, the upper layer consisting principally of organic acid and the lower layer consisting of aqueous sulfuric acid. These may be separated directly, or the whole product may be diluted with water and the organic acid separated directly or by extraction, distillation, or other suitable means.

In the following examples, carried out in a reactor of 400 cc. capacity, all parts are by weight.

*Example 1.*—A silver-lined, high-pressure reactor is charged with 134 parts of 73% aqueous sulfuric acid. This occupies approximately one-fourth of the free space in the reactor. After closing and cooling the reactor, the air is evacuated and 56 parts of isobutylene is admitted. Carbon monoxide is then admitted to a total pressure of 200 atmospheres, and the reactor is placed in a reciprocating mechanism designed to produce vigorous agitation of the contents. The shaking is begun and the internal temperature is raised during 19 minutes to 100° C. At this time the pressure, which has reached 250 atmospheres is raised stepwise over a period of less than 20 minutes to 950 atmospheres by injection of carbon monoxide. During 8 hours in which the internal temperature is maintained in the range of 99°–101° C. and the pressure is maintained within the range of 875–950 atmospheres, the total drop in pressure is 90 atmospheres. During an additional 1.5 hours under these conditions, the pressure drop is less than 10 atmospheres, so the reaction is judged to be essentially complete. The reactor is cooled, pressure is released, and the product is discharged.

The liquid product is diluted with water and the upper layer is separated and washed with water. This material is almost entirely soluble in 10% sodium hydroxide solution. The acids are liberated from the solution of their sodium salts by acidification with sulfuric acid, washed with water, and dried. The total yield of organic acids amounts to 54 parts.

This mixture is readily separated by distillation into trimethylacetic acid, amounting to approximately 60% by weight of the total acids, a fraction boiling in the range 230°–240° C. having a neutralization equivalent of 158 corresponding to that of a 9-carbon atom aliphatic carboxylic acid amounting to 30% of the total acid, and 10% of higher boiling material consisting of higher molecular weight acids.

*Example 2.*—In an apparatus similar to that described in Example 1, there is charged 84 parts of triisobutylene and 67 parts of 73% aqueous sulfuric acid. The reactor is closed and carbon monoxide is admitted to a pressure of 200 atmospheres. Agitation is begun and the reactor is heated to an internal temperature of 120° C. at which temperature the pressure is increased to 975 atmospheres. During 10.5 hours at 116°–122° C. and 790–975 atmospheres pressure, maintained by repressuring with carbon monoxide, the total drop in pressure is 155 atmospheres. The reactor is cooled, pressure is released, and the product is discharged.

The liquid product is diluted with water and the upper layer is separated and washed with water. It is a brownish oil amounting to 79 parts. When extracted with 10% and then 5% sodium hydroxide solution, the major part of the product is dissolved, and the remaining alkali-insoluble oil amounts to only 16 parts. By acidification of the caustic solution with sulfuric acid, 54 parts of organic acids are recovered as a light brown oil.

*Example 3.*—A reactor similar to that described in Example 1 is charged with 67 parts of 73% sulfuric acid and 54 parts of vinyl cyclohexene (a dimer of butadiene). The air is evacuated. Carbon monoxide is admitted to a pressure of 200 atmospheres, the reactor is closed, agitation is begun, and the reactor is heated to an internal temperature of 98° C. During 9.5 hours the pressure is maintained within the range 560–970 atmospheres by injection of carbon monoxide at 98°–101° C., and the total pressure drop is 130 atmospheres. The reactor is cooled, the pressure is released, and the product is discharged.

The dark gum is washed with water and then dissolved in ether. The ether solution is then extracted with 10% sodium hydroxide. This extract, when acidified, yields two parts of acid which is insoluble in water but soluble in 10% sodium hydroxide. The remaining ether solution contains sodium soaps of acids which are insoluble in the strong sodium hydroxide. When the ether solution is shaken with water, the sodium salt dissolves in the water to give a solution which foams strongly when agitated. Twenty-five parts of alkali-insoluble material remain in the ether solution. When the weakly alkaline aqueous solution of the sodium salts is acidified with sulfuric acid, the free acids are precipitated and are filtered off. These are in the form of a gray powder, amounting to 20 parts by weight, which is soluble in very dilute sodium hydroxide, giving solutions which foam strongly when shaken.

Aqueous sulfuric acid of 64–84% concentration can be used as condensing agent for the reaction of carbon monoxide with the olefine hereinbefore described. Examples of such compounds are isobutylene, polyisobutylenes, isoamylenes, polyisoamylenes, terpenes, and other cyclic olefins.

The concentration of the aqueous sulfuric acid should be within the range 64–84% sulfuric acid by weight, i. e., 36–16% water by weight, although somewhat higher or lower concentrations may be used with considerable sacrifice in yields of the acids produced. The preferred concentration is 70–80% by weight $H_2SO_4$, since at lower concentrations the conversion of the olefinic compound to polymers is greater and at higher concentrations side reactions resulting in the formation of organic sulfur compounds are favored. To obtain maximum yields, at least as much as one mole of sulfuric acid per mole of olefin should be employed.

The reaction temperature is within the range 50°–200° C. for economical yields. However, reaction proceeds slowly at lower temperatures, and some acids are obtained at temperatures above 200° C. but side products produced by the oxidizing action of sulfuric acid may predominate. Pressures in excess of atmospheric are necessary, but the exact magnitude is principally a matter of convenience. Pressures from about 100 to about 1500 atmospheres are most suitable. Higher pressures may be used, however, if desired.

I claim:

1. A process for the preparation of trimethylacetic acid by the carboxylation of isobutylene which comprises subjecting isobutylene to a reaction in the presence of 73% aqueous sulfuric acid in the ratio of 134 parts of the sulfuric acid per 56 parts of isobutylene, pressuring the olefin-acid mixture with carbon monoxide under pressures ranging between 250 and 950 atmospheres and conducting the reaction at a temperature of between 99 and 101° C.

2. In a process for the carboxylation of isoolefins selected from the group consisting of isobutylene, triisobutylene and vinyl cyclohexene with carbon monoxide at a temperature between 50 and 200° C. and under a pressure between 100 and 1500 atmospheres, the step which comprises conducting the reaction in the presence of from 64 to 84% aqueous sulfuric acid.

3. In a process for the carboxylation of isoolefins selected from the group consisting of isobutylene, triisobutylene and vinyl cyclohexene with carbon monoxide at a temperature between 50 and 200° C. and under a pressure between 100 and 1500 atmospheres, the step which comprises conducting the reaction in the presence of from 70 to 80% aqueous sulfuric acid.

4. In a process for the carboxylation of isobutylene with carbon monoxide at a temperature between 50 and 200° C. and under a pressure between 100 and 1500 atmospheres, the step which comprises conducting the reaction in the presence of from 64 to 84% aqueous sulfuric acid.

5. In a process for the carboxylation of triisobutylene with carbon monoxide at a temperature between 50 and 200° C. and under a pressure between 100 and 1500 atmospheres, the step which comprises conducting the reaction in the presence of from 64 to 84% aqueous sulfuric acid.

6. In a process for the carboxylation of vinyl cyclohexene with carbon monoxide at a temperature between 50 and 200° C. and under a pressure between 100 and 1500 atmospheres, the step which comprises conducting the reaction in the presence of from 64 to 84% aqueous sulfuric acid.

THOMAS A. FORD.

REFERENCES CITED

The following references are of record in the file of this patent:

UNITED STATES PATENTS

| Number | Name | Date |
|---|---|---|
| 2,022,244 | Larson | Nov. 26, 1935 |
| 1,995,930 | Larson | Mar. 26, 1935 |

OTHER REFERENCES

Hardy, Jour. Chem. Soc. (London), vol. 1936, pp. 364–365.